March 25, 1930.                C. A. RITCHIE                1,752,028

ADJUSTABLE PITMAN ROD

Filed May 31, 1928

INVENTOR
Charles A. Ritchie
Ralph Burch

Patented Mar. 25, 1930

1,752,028

UNITED STATES PATENT OFFICE

CHARLES ALEXANDER RITCHIE, OF D'ARCY, SASKATCHEWAN, CANADA

ADJUSTABLE PITMAN ROD

Application filed May 31, 1928. Serial No. 281,810.

This invention relates to improvements in an adjustable pitman rod. Its primary object being to provide a rod that will permit of a minute adjustment in its length, and while being very inexpensive and easy to construct, is extremely efficient in attaining the ends for which it is designed.

With these and other objects in view it will be seen that the invention lies in the novel construction and arrangement of parts as hereinafter more specifically set forth, claimed and shown in the accompanying drawings, forming a part of this present application and in which:—

Figure 1:
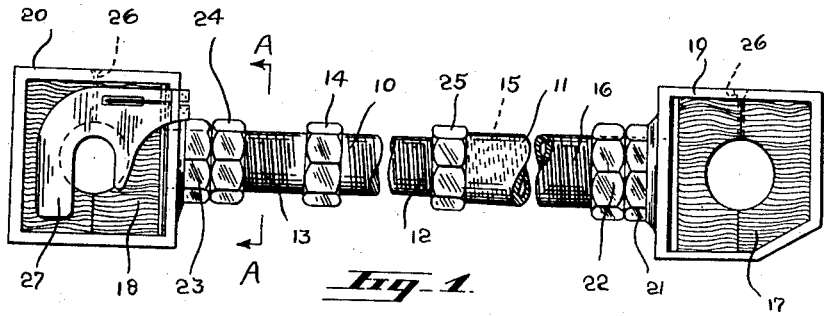
Fig. 1 is a general view of my invention.
Figure 2:
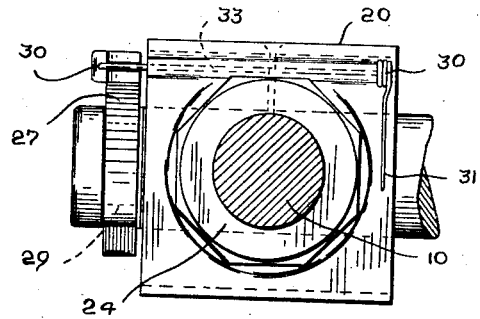
Fig. 2 is a cross section view along line A—A of Fig. 1.
Figure 3:
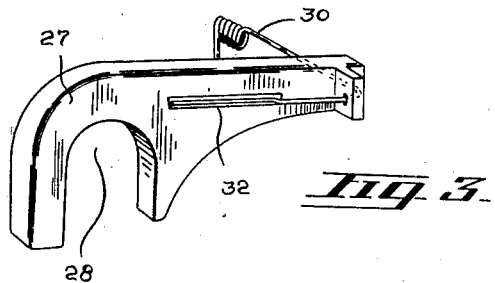
Fig. 3 is a perspective view of the keeper.

Referring more in detail to the drawings in which similar reference characters designate corresponding parts throughout the several views. It will be seen that the invention comprises a bolt 10 and a tube 11. The bolt 10 is threaded at each end as shown at 12 and 13 and has a nut 14 positioned midway between the threaded portions by which the said bolt 10 is turned. The tube 11 is threaded on the inside at one end as shown at 15 and on the outside at the opposite end as shown at 16. The split wooden bearing blocks 17 and 18 are supported in the bearing housings 19 and 20. A nut 21 is welded to the housing 19 into which the tube 11 is screwed. A check nut 22 being used to secure the tube in this position. In a similar manner a nut 23 is welded to the housing 20 into which one end of the bolt 10 is screwed and a check nut 24 provided to secure the same. The adjustment for the pitman rod is obtained by screwing the bolt 10 into the tube 11 to the required position, which, as it will be seen, will regulate the distance between the centers of the two bearings. When this adjustment has been made the check nuts 24 and 25 on the bolt 10 are tightened and any further movement thus prevented. Suitable lubrication holes 26 are drilled in the bearing housings 19 and 20 and in the bearing blocks 17 and 18.

The keeper 27 is provided to prevent the bearings from coming off the crank pins. The slot 28 is placed in the groove 29 in the end of the crank pin and is held down by a spring wire 30, one end of which bears against the side of the bearing housing at 31, the other end fits into a slot 32 in the keeper 27. The spring 30 is pivoted in a hole 33 in the bearing housing. This keeper may be used at both ends of the pitman rod or only at one end or may be discarded altogether on some types of machinery.

It is believed that the construction and advantages of the structure shown may be apparent from the foregoing paragraphs taken in connection with the accompanying drawings without further detailed description.

While the preferred embodiment of the invention has been disclosed, it is understood that minor changes in the details of construction, combination and arrangement of co-operating parts may be resorted to within the scope of what is claimed without departing from the spirit of the invention.

What I claim:—

In an adjustable pitman rod having a bolt threaded at both ends and a nut positioned midway of its length; a tube threaded inside at one end to receive the said bolt and threaded outside at the opposite end; bearing housings; a nut welded to each of the bearing housings, one designed to receive the bolt, the other to receive the outer thread of the tube, and a plurality of check nuts to secure the bolt and tube, substantially as set forth.

In testimony whereof I affix my signature.

CHARLES ALEXANDER RITCHIE.